United States Patent
Huang et al.

(10) Patent No.: US 11,140,327 B2
(45) Date of Patent: Oct. 5, 2021

(54) IMAGE-CAPTURING DEVICE AND METHOD FOR OPERATING IMAGE-CAPTURING SYSTEM OF TWO CAMERAS

(71) Applicant: AVer Information Inc., New Taipei (TW)

(72) Inventors: Kuo-Hao Huang, New Taipei (TW); Chung-Yi Kao, New Taipei (TW); Eric Chi-Chian Yu, New Taipei (TW); Shyh-Feng Lin, New Taipei (TW)

(73) Assignee: AVer Information Inc., New Taipei (TW)

( * ) Notice: Subject to any disclaimer, the term of this patent is extended or adjusted under 35 U.S.C. 154(b) by 0 days.

(21) Appl. No.: 16/454,036

(22) Filed: Jun. 26, 2019

(65) Prior Publication Data

US 2020/0007777 A1 Jan. 2, 2020

(30) Foreign Application Priority Data

Jun. 28, 2018 (TW) .................................. 107122385

(51) Int. Cl.
*H04N 5/232* (2006.01)

(52) U.S. Cl.
CPC ..... *H04N 5/23296* (2013.01); *H04N 5/23212* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 9,185,291 B1* | 11/2015 | Shabtay | H04N 5/225 |
| 10,230,898 B2* | 3/2019 | Cohen | H04N 5/23296 |
| 10,356,332 B2* | 7/2019 | Cohen | H04N 5/23216 |
| 10,893,206 B1* | 1/2021 | Bart | H04N 5/23296 |
| 2007/0165103 A1* | 7/2007 | Arima | H04N 5/23203 |
| | | | 348/14.01 |
| 2007/0296837 A1* | 12/2007 | Morita | H04N 5/232 |
| | | | 348/240.99 |
| 2010/0277619 A1* | 11/2010 | Scarff | H04N 5/2258 |
| | | | 348/240.1 |

(Continued)

FOREIGN PATENT DOCUMENTS

| | | |
|---|---|---|
| CN | 106385541 A | 2/2017 |
| TW | 201612616 A | 4/2016 |
| TW | 201806377 A | 2/2018 |

*Primary Examiner* — Cynthia Segura
(74) *Attorney, Agent, or Firm* — CKC & Partners Co., LLC

(57) ABSTRACT

An image-capturing device includes a camera module and a controller. The camera module captures an image of an object. The camera module includes a first camera and a second camera. The first camera has a first field of view (FOV) and captures an image in the first FOV, so as to produce a first image. The second camera is adjacent to the first camera and has a second FOV, in which the first FOV is wider than the second FOV. The second camera captures an image in the second FOV, so as to produce a second image. A displayer displays one of the first and second images. When a zoom ratio of the first image increases, the controller selects a display region in the first image according to an object distance, such that the display region is enlarged and then displayed on the displayer.

10 Claims, 8 Drawing Sheets

(56) References Cited

U.S. PATENT DOCUMENTS

| | | | |
|---|---|---|---|
| 2012/0026366 A1* | 2/2012 | Golan | H04N 5/23264 |
| | | | 348/240.2 |
| 2014/0098195 A1* | 4/2014 | Pace | H04N 13/25 |
| | | | 348/47 |
| 2015/0085174 A1* | 3/2015 | Shabtay | G02B 5/1814 |
| | | | 348/336 |
| 2016/0241793 A1* | 8/2016 | Ravirala | H04N 5/23296 |
| 2016/0301840 A1* | 10/2016 | Du | H04N 5/23229 |
| 2017/0134643 A1* | 5/2017 | Kim | G06K 9/00281 |
| 2017/0223261 A1* | 8/2017 | Shimizu | G06K 9/6202 |
| 2017/0230585 A1 | 8/2017 | Nash et al. | |
| 2020/0014961 A1* | 1/2020 | Ramaswamy | |
| | | | H04N 21/440263 |
| 2021/0120183 A1* | 4/2021 | Shabtay | H04N 5/23232 |

* cited by examiner

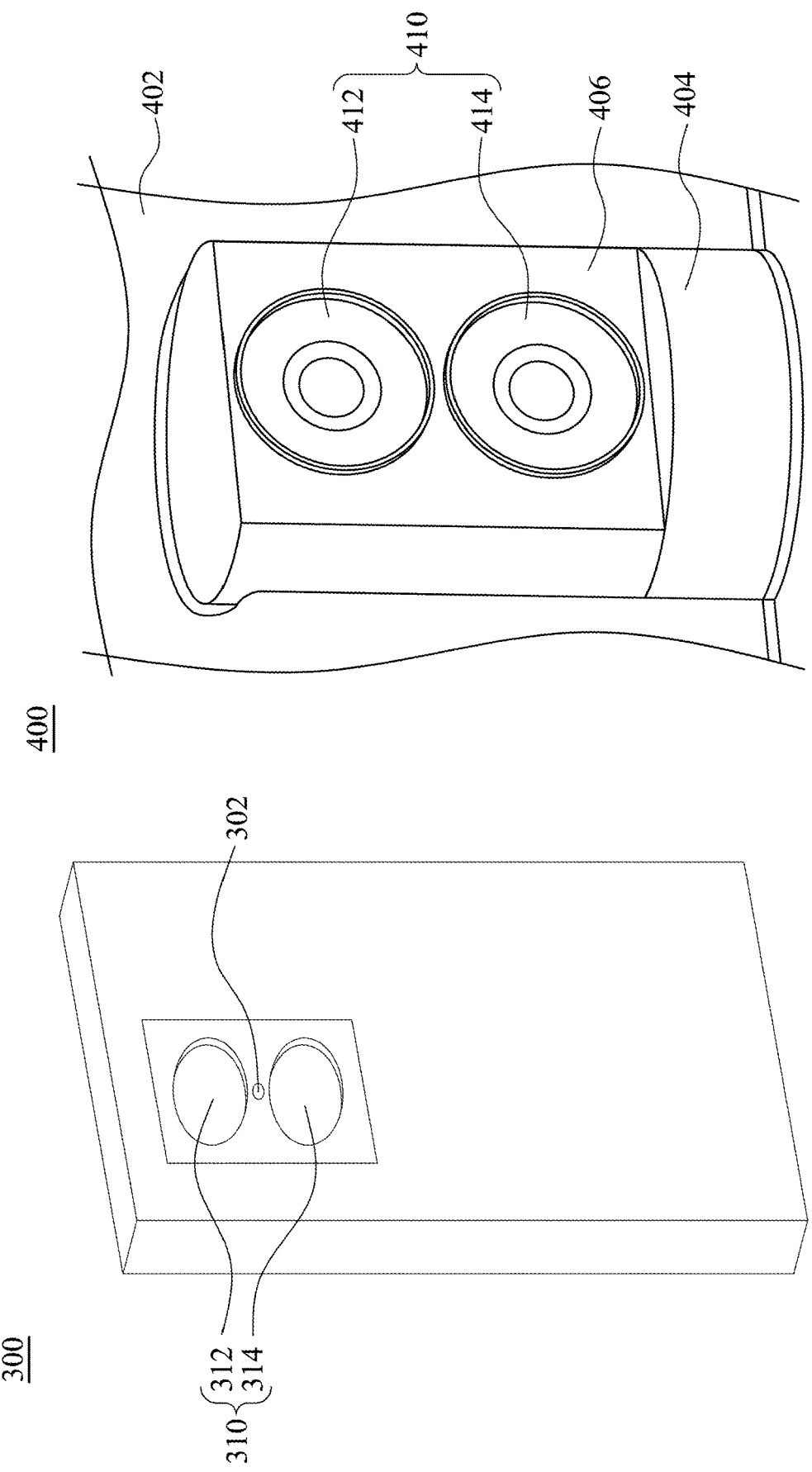

IMAGE-CAPTURING DEVICE AND METHOD FOR OPERATING IMAGE-CAPTURING SYSTEM OF TWO CAMERAS

RELATED APPLICATIONS

This application claims priority to Taiwanese Application Serial Number 107122385, filed Jun. 28, 2018, which is herein incorporated by reference.

BACKGROUND

Technical Field

The present disclosure relates to an image-capturing device and a method for operating an image-capturing system.

Description of Related Art

In consumer products, because display devices are convenient to capture and display images, such device has become an increasingly important mainstream product. Accordingly, many consumer products are designed to be able to capture and display images recorded in digital form, such as portable devices, wearable devices, digital cameras, smartphones or surveillance cameras, and the like.

In order to enhance a zoom-in/out function for the images, some consumer products use a dual camera module to implement the zoom-in/out function. However, for the products using the dual camera module, different cameras of the dual camera module may have individually properties and functions. Therefore, when the dual camera module is performed for capturing an image of a target scene, images outputted by the different cameras would be different than each other as well. For example, an offset value may occur between two of the images. Therefore, how to solve the above problem has become one of the important topics in the industry and become an issue that related areas need to improve as well.

SUMMARY

An aspect of the present disclosure is to provide an image-capturing device including a camera module and a controller. The camera module is configured to capture an image of an object, and the image is displayed by a displayer. The camera module includes a first camera and a second camera. The first camera has a first field of view (FOV) and is configured to capture an image in the first FOV, so as to produce a first image. The second camera is adjacent to the first camera and has a second FOV, in which the first FOV is wider than the second FOV. The second camera is configured to capture an image in the second FOV, so as to produce a second image. The displayer displays one of the first and second images. When a zoom ratio of the first image increases, the controller is configured to select a display region in the first image according to an object distance from the object to the camera module, such that the display region is enlarged and then displayed on the displayer.

In some embodiments, each of the first camera and the second camera has a first focal length and a second focal length, and the first focal length is less than the second focal length.

In some embodiments, the controller includes a calculation unit. The calculation unit is configured to calculate an offset value between the first image and the second image according to the object distance, the first focal length, and the second focal length. The controller is further configured to select the display region according to the offset value.

In some embodiments, the first camera and the second camera are spaced apart from each other by a gap, and the controller includes a calculation unit. The calculation unit is configured to calculate an offset value between the first image and the second image according to the object distance and gap. The controller is further configured to select the display region according to the offset value.

In some embodiments, the camera module further includes an auto focus module. The auto focus module is configured to make the first camera focus on the object. The first camera has a first focal length. The controller is further configured to calculate the object distance according to the first focal length and a focus position of the first camera which is focused on the object.

An aspect of the present disclosure is to provide an image-capturing device including a camera module, a sensor, and a controller. The camera module is configured to capture an image of an object, and the image is displayed by a displayer. The camera module includes a first camera and a second camera. The first camera has a first FOV and is configured to capture an image in the first FOV, so as to produce a first image. The second camera is adjacent to the first camera and has a second FOV, in which the first FOV is wider than the second FOV. The second camera is configured to capture an image in the second FOV, so as to produce a second image. The displayer displays one of the first and second images. The sensor is configured to detect an object distance from the object to the camera module. When a zoom ratio of the first image increases, the controller is configured to select a display region in the first image according to the object distance, such that the display region is enlarged and then displayed on the displayer.

An aspect of the present disclosure is to provide a method for operating an image-capturing system including steps as follows. A first image is produced through capturing an object within a FOV by a first camera and a second image is produced through capturing the object by a second camera. The first image is displayed by a displayer, in which a display region in the first image is selected according to an object distance of the object when a zoom ratio of the first image increases such that the display region is enlarged and then displayed on the displayer. When the zoom ratio of the first image increases to a switch ratio, the second image is switched to display.

In some embodiments, selecting the display region in the first image according to the object distance of the object includes steps as follows. An offset value between the first image and the second image is calculated according the object distance, in which the first image and the second image are at the same zoom ratio. The display region in the first image is selected according to the offset value.

In some embodiments, the method further includes detecting a distance from the object to the camera module including the first camera and the second camera by a sensor, so as to obtain the object distance.

In some embodiments, the method further includes steps as follows. The first camera is focused on the object. The object distance is calculated according to a focal length of the first camera and a focus position of the first camera which is focused on the object.

BRIEF DESCRIPTION OF THE DRAWINGS

FIG. 9 is a schematic three-dimensional view of an image-capturing device according to a second embodiment of the present disclosure; and FIG. 10 is a schematic three-dimensional view of an image-capturing device according to a third embodiment of the present disclosure.

DETAILED DESCRIPTION

Figure 2:
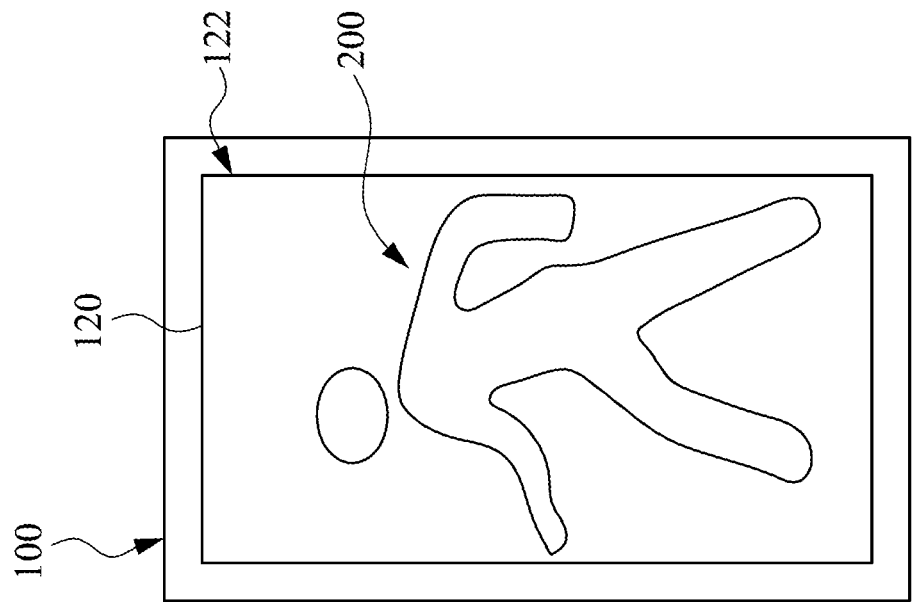
FIG. 2 is a schematic diagram showing displaying an image of an object by an image-capturing device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

It will be understood that, although the terms first, second, third etc. may be used herein to describe various elements, components, regions, layers and/or sections, these elements, components, regions, layers and/or sections should not be limited by these terms.

Figure 1:
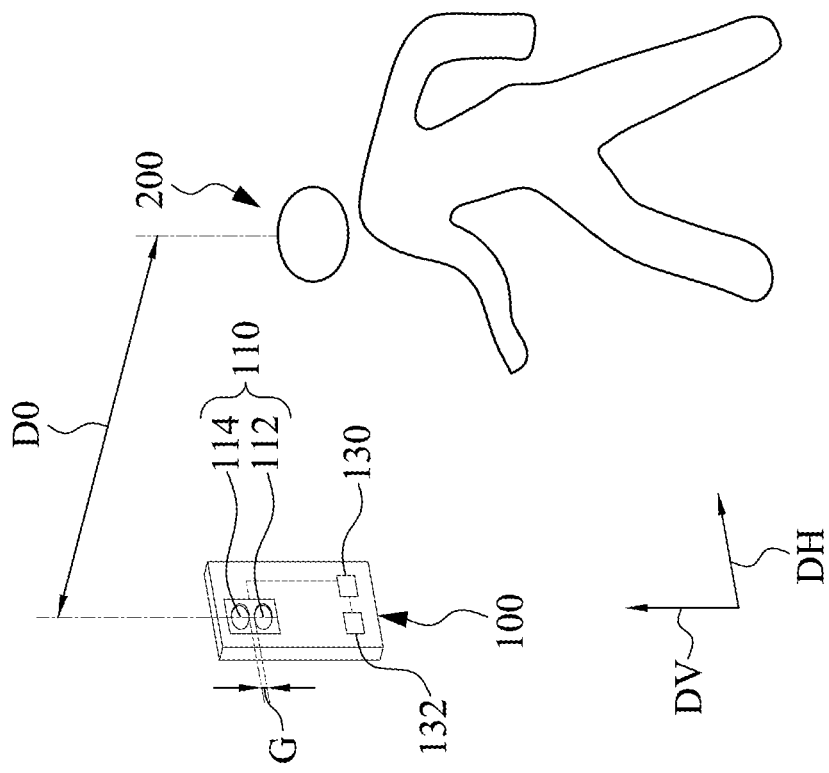
FIG. 1 is a schematic diagram showing an image of an object is captured by using an image-capturing device according to a first embodiment of the present disclosure.

Reference is made to FIGS. 1 and 2. FIG. 1 is a schematic diagram showing an image of an object 200 is captured by using an image-capturing device 100 according to a first embodiment of the present disclosure, and FIG. 2 is a schematic diagram showing that an image of an object 200 is displayed by an image-capturing device 100. An image-capturing device 100 of the present disclosure can be configured to capture an image of an object 200 and display the captured image simultaneously in real time. The image-capturing device 100 illustrated in either FIG. 1 or FIG. 2 is applied to a handheld device, such as a smartphone. However, the present disclosure is not limited thereto. For example, the image-capturing device of the present disclosure may be applied to a security camera, as illustrated in FIG. 10. In other embodiments, the image-capturing device of the present disclosure can be applied to a video-conferencing camera, a broadcast camera, or a tracking camera.

The image-capturing device 100 includes a camera module 110, a displayer 120, an auto focus module 130, and a controller 132. The camera module 110 is configured to capture an image of the object 200, and the displayer 120 is configured to display the image captured by the camera module 110. In order to describe conveniently, a vertical direction DV and a horizontal direction DH are illustrated in FIG. 1, in which the vertical direction DV and the horizontal direction DH are orthogonal with each other. In addition, under a situation involving the image-capturing device 100 illustrated in either FIG. 1 or FIG. 2 is applied to a handheld device, the camera module 110 and the displayer 120 are integrated into the same device. However, under a situation involving the image-capturing device 100 is applied to other devices (e.g., the security camera illustrated in FIG. 10, a video-conferencing camera, a broadcast camera, or a tracking camera), the displayer may be omitted. Alternatively, under a situation involving the image-capturing device 100 is applied to other devices, a displayer may be modified to externally connect to the image-capturing device 100. That is, the displayer and the camera module 110 may be not integrated into the same device, and the displayer can serve as an external device with respect to the image-capturing device 100. In embodiments involving with the displayer and the camera module 110 are not integrated into the same device, the displayer and the camera module 110 can collectively serve as an image-capturing system. Similarly, the image-capturing device 100 of FIG. 1 including the camera module 110 and the displayer 120 can be referred to as an image-capturing system as well.

In the present disclosure, the camera module 110 includes a first camera 112 and a second camera 114, and the first camera 112 and the second camera 114 are adjacent to each other. In the present embodiment, the first camera 112 and the second camera 114 can be arranged along the vertical direction DV and be spaced apart from each other by a gap G, in which the gap G extends along the vertical direction DV. In other embodiments, the first camera 112 and the second camera 114 can be arranged along the horizontal direction DH and be spaced apart from each other by a gap G, in which such gap G extends along the horizontal direction DH.

The first camera 112 and the second camera 114 may have focal lengths different than each other to achieve a dual camera configuration, thereby enhancing an image zoom function of the image-capturing device 100. For example, the first camera 112 and the second camera 114 may respectively have a first focal length and a second focal length, and the first focal length is less than the second focal length. By this configuration, the first camera 112 and the second camera 114 can respectively have a first field of view (FOV) and a second FOV, in which the first FOV is wider than the second FOV, such that the first camera 112 is suitable for capturing a wide-angle image and the second camera 114 is suitable for capturing a portrait image. In some embodiments, the first camera 112 is a wide-angle lens, and the second camera 114 is a telescope lens. Furthermore, the first camera 112 may be a fixed-focal-length lens camera, and the second camera 114 may be a fixed-focal-length lens camera or an optical zoom lens camera.

The image-capturing device 100 can display the image captured by the camera module 110 through the displayer 120. For example, the first camera 112 can be configured to produce a first image by capturing an image of the object 200 in the first FOV, and the second camera 114 can be configured to produce a second image by capturing an image of the object 200 in the second FOV. According to an image-display condition of the image-capturing device 100, the displayer 120 can display one of the first image and the second image through a display screen 122. For example, the displayer 120 can first display the first image through the display screen 122 and then is switched to display the second image. Alternatively, the displayer 120 can display the second image through the display screen 122 and then is switched to display the first image. In some embodiments, when the image is displayed through the image-capturing device 100, setting a switch display ratio can be performed. When the image-display condition is not beyond the switch display ratio, the displayer 120 can display the first image through the display screen 122. In contrast, when the image-display condition is beyond the switch display ratio, the displayer 120 can display the second image through the display screen 122.

The auto focus module 130 can be electrically connected to the camera module 110 through the controller 132. The auto focus module 130 can be configured to make the first camera 112 and the second camera 114 focus on the object 200. For example, the image-capturing device 100 may include a step motor (not illustrated). The step motor is coupled to either the first camera 112 or the second camera 114, and the auto focus module 130 is electrically connected to the step motor through the controller 132. The auto focus module 130 can control the step motor to adjust a relative position between either the first camera 112 or the second camera 114 and the object 200, so as to complete the focusing program. The focusing program described above may be taken as an auto focusing program. In some embodiments, the auto focus module 130 can be achieved by a hardware, a software, or a firmware of the image-capturing device 100.

The controller 132 is electrically connected to the camera module 110 and the displayer 120. The controller 132 can calculate an object distance DO from the object 200 to the camera module 110 through the auto focus module 130. For example, when the auto focus module 130 completes the auto focusing program, a focus position of either the first camera 112 or the second camera 114 can be transmitted to the controller 132 by the auto focus module 130, and then the controller 132 can calculate the object distance DO from the object 200 to the camera module 110 through the focal lengths and the focus positions of the cameras. More specifically, during an auto focus process, the first camera 112 or the second camera 114 may be moved from a first position to a second position by an actuator (e.g., a step motor, which is controlled by the auto focus module 130) for a purpose of focusing on the object, and such second position can be referred to as a focus position. Accordingly, the term "the positions of the cameras" means the focus positions, and the focus positions and a position difference (i.e., the difference between the first position and the second position) could be introduced in to the parameters of calculating the object distance DO. Furthermore, when the display screen 122 displays the image captured by the first camera 112 and a zoom ratio increases, the controller 132 can be configured to select a display region in the first FOV of the first camera 112 according to the object distance DO, and the display region is enlarged and then displayed on the display screen 122. In other words, the display region within the first FOV of the first camera 112 to be enlarged can be selected by the controller 132, such that the image captured by the first camera 112 can match the image captured by the second camera 114.

As far as the dual camera configuration of the image-capturing device 100 is concerned, when there is a requirement for switching the image due to the enlargement of the image, a situation involving the screen is not switched smoothly may make screen pulsation occur (i.e., the screen pulsation may be caused by discontinuously displaying the images during zoom-in or zoom-out). By the configuration above, when the zoom ratio of the image-capturing device 100 increases to the switch display ratio, the first image and the second image can show the same appearance, thereby smoothly switching from the first image to the second image. Therefore, when the image-display condition is close to the switch display ratio, it can allow the appearance of the first image to match the appearance of the second image, so as to prevent the screen pulsation from occurring (or to ease the scree pulsation off). The following descriptions are provided for further explaining the selection mechanism of the controller.

Figure 3:
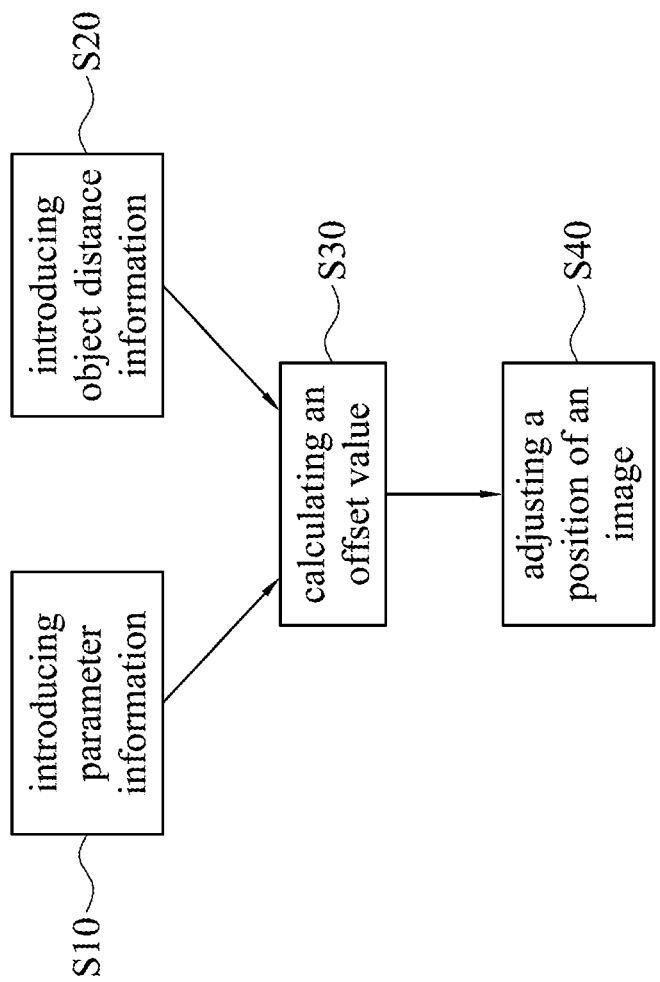
FIG. 3 is a flow chart of an image processing method of an image-capturing device according to the first embodiment of the present disclosure.

Reference is made to FIG. 3, which is a flow chart of an image processing method of an image-capturing device 100 according to the first embodiment of the present disclosure. A method for operating the image-capturing device can include steps S10, S20, S30, and S40. The steps S10, S20, S30, and S40 respectively is introducing parameter information, introducing object distance information, calculating an offset value, and adjusting a position of an image.

In the step S10, parameter information can be introduced into the controller, in which the parameter information includes the gap between the first camera and the second camera, the first focal length of the first camera, the second focal length of the second camera, other physic properties relative to the first camera and the second camera, or combinations thereof.

In the step S20, object distance information can be introduced into the controller. The object distance information can be obtained by transmitting the focus positions of the first camera and the second camera to the controller through the auto focus module and then calculating through the controller. Herein, the term "the focus positions of the first camera and the second camera" means the positions where the first camera and the second camera are moved to focus on the object.

In the step S30, the offset value of the image can be calculated from the parameter information and the object distance information. Herein, the term "offset value" means that an offset value between the first image and the second image which are at the same zoom ratio. For example, when the image-display condition conforms to the switch display ratio, the first image and the second image can show the same appearance (or the same FOV). In such situation, the object shown in the first image and the object shown in the second image may have the substantially same zoom ratio on the display screen. If there is a distance difference between the object shown in the first image and the object shown in the second image, this distance difference can be taken as the "offset value". In some embodiments, the controller includes a calculation unit. According to the parameter information and the object distance information, the calculation unit is configured to calculate the offset value between the first image and the second image, which are at the same zoom ratio. Thereafter, according to the offset value, the controller can further select a display region in the first image to be enlarged. In other words, the calculation parameters used to calculate the offset value by the calculation unit may include the gap between the first camera and the second camera, the first focal length of the first camera, the second focal length of the second camera, the object distance, or combinations thereof. The calculation unit can be achieved by a hardware, a software, or a firmware of the image-capturing device.

In the step S40, according to the offset value, a display region in the first image is selected, and the display region is enlarged and then displayed on the display screen. By selecting the display region in the first image according to the offset value, when the image-display condition conforms to the switch display ratio, the appearance of the first image can match the appearance of the second image. Accordingly, when the display screen of the displayer is switched from the first image to the second image, a situation involving the screen pulsation can be prevented or eased off.

Figure 4:
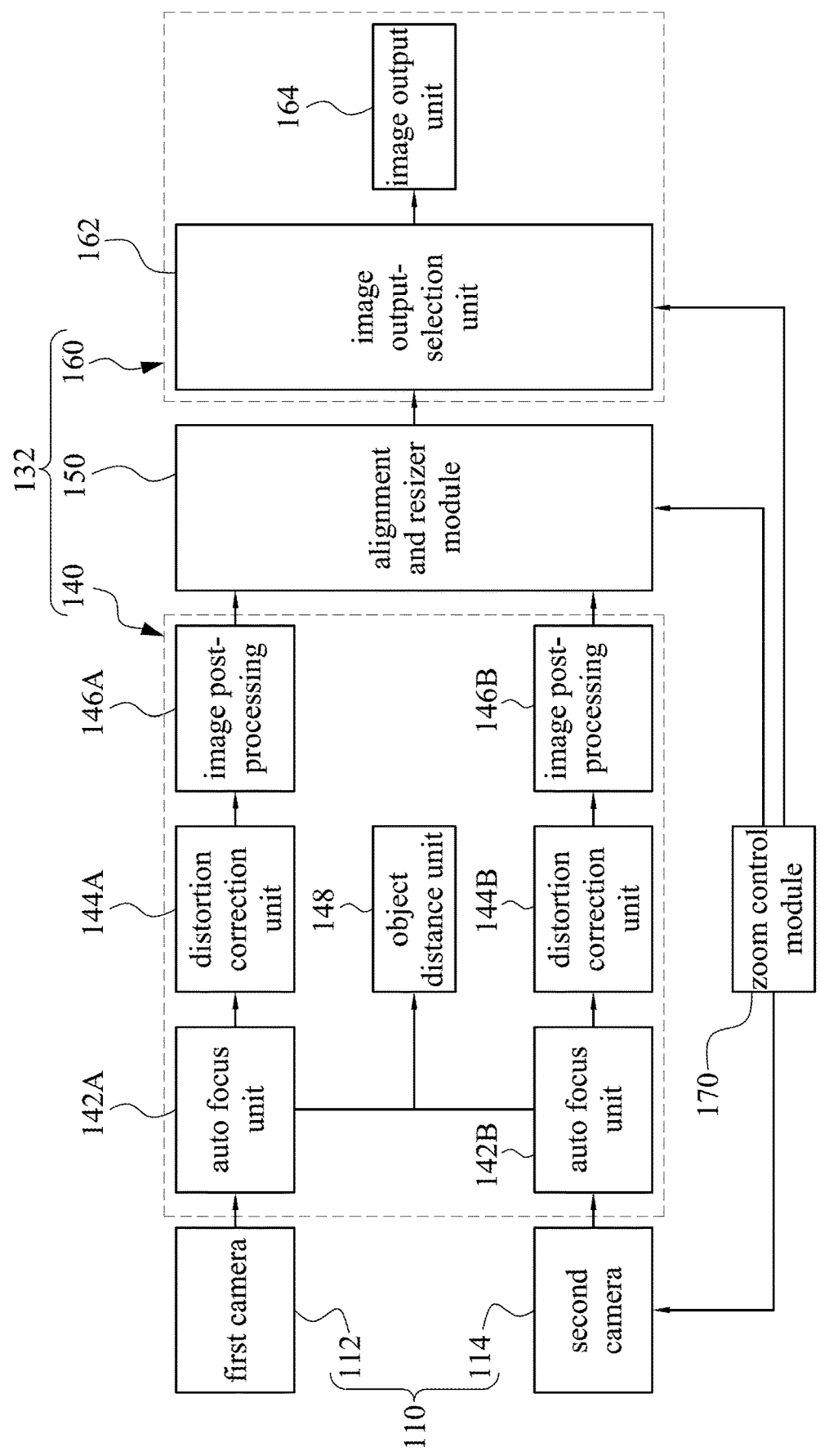
FIG. 4 is a block diagram showing functional components of the image-capturing device according to the first embodiment of the present disclosure.

Reference is made to FIG. 4, which is a block diagram showing functional components of the image-capturing device 100 according to the first embodiment of the present disclosure. The operating method as described in FIG. 3 can be achieved by the functional components in FIG. 4. The controller 132 includes an image processing module 140, an alignment and resizer module 150, an image output module 160, and a zoom control module 170. The image processing module 140, the alignment and resizer module 150, the image output module 160, and the zoom control module 170 can be achieved by a hardware, a software, or a firmware of the image-capturing device 100.

During the period that the camera module captures the image of the object, the first image and the second image which are respectively produced by the first camera 112 and the second camera 114 can be processed by the image processing module 140, the alignment and resizer module 150, and the image output module 160 in sequence. The zoom control module 170 can be configured to transmit at least one command signal to the second camera 114, the alignment and resizer module 150, and the image output module 160. Furthermore, during the period that capturing the image of the object, no matter which image (e.g., the first image or the second image) is displayed on the display screen of the displayer, both the first camera 112 and the second camera 114 would output the image to the corresponding units to process. For example, although the display screen of the displayer displays the first image, the second camera at the same time would capture the image of the object and output the image to the corresponding units to process as well.

The image processing module 140 includes auto focus units 142A and 142B, distortion correction units 144A and 144B, image post-processing 146A and 146B. During the period that capturing the image of the object, the first image and the second image which are respectively produced by the first camera 112 and the second camera 114 can be processed by the auto focus units 142A and 142B, the distortion correction units 144A and 144B, and the image post-processing 146A and 146B in sequence. Similar to the auto focus module as described previously, the auto focus units 142A and 142B can make the first camera 112 and the second camera 114 perform the auto focusing program on the object. Similarly, after the first camera 112 and the second camera 114 perform the auto focusing program on the object, an object distance unit 148 of the controller 132 can calculate the object distance of the object according to the focal lengths of the cameras and the focus position of the corresponding camera after the auto focusing program. Similarly, the term "the focus position of the corresponding camera" means the position where the corresponding camera is moved to focus on the object. The distortion correction units 144A and 144B can respectively perform an aberration correction program to the first image and the second image. The image post-processing 146A and 146B can respectively perform an automatic exposure program, an automatic white balance program, and an image quality correction program to the first image and the second image.

Thereafter, the first image and the second image can be transmitted to the alignment and resizer module 150. The alignment and resizer module 150 can transmit the command signal through the zoom control module 170, so as to set the switch display ratio. For example, the switch display ratio can be set as 1.8. Under such setting, when the zoom ratio of the first image displayed by the display screen increases to 1.8, the display screen is switched to display the second image. During increasing the zoom ratio of the first image displayed by the display screen, the alignment and resizer module 150 can adjust and select the display region of the first image, such that the appearance of the first image can match the appearance of the second image which is at the minimum zoom ratio (e.g., 1.8). Therefore, when the zoom ratio of the first image displayed by the display screen increases to 1.8 and when the display screen is switched to display the second image, the screen pulsation can be prevented (or be eased off).

The first image and the second image then can be transmitted from the alignment and resizer module 150 to the image output module 160. The image output module 160 includes an image output-selection unit 162 and an image output unit 164. The first image and the second image transmitted from the alignment and resizer module 150 can be transmitted to the image output-selection unit 162 first. Then, the image output-selection unit 162 can select which image is to be outputted according to the command signal transmitted from the zoom control module 170. For example, if the current zoom ratio is not beyond the switch display ratio, the first image would be selected to serve as an output image. Alternatively, if the current zoom ratio is beyond the switch display ratio, the second image would be selected to serve as an output image. After determining which image is to be outputted, the selected output image can be transmitted to the image output unit 164, so as to display the image through the display screen of the displayer.

Figure 5:
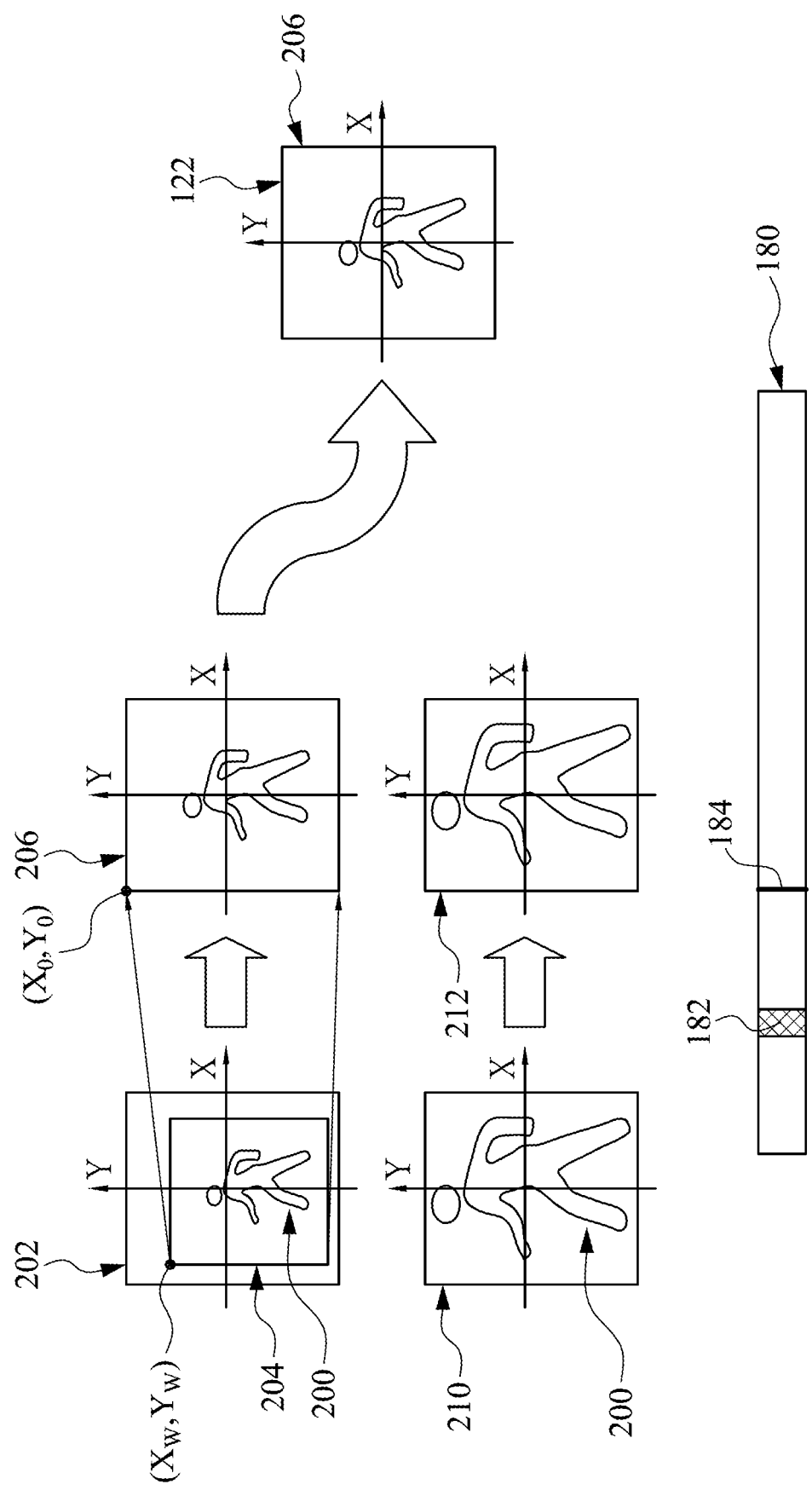
FIGS. 5, 6, and 7 are schematic diagrams showing a zoom-in action is performed with a display screen of the image-capturing device.
Figure 6:
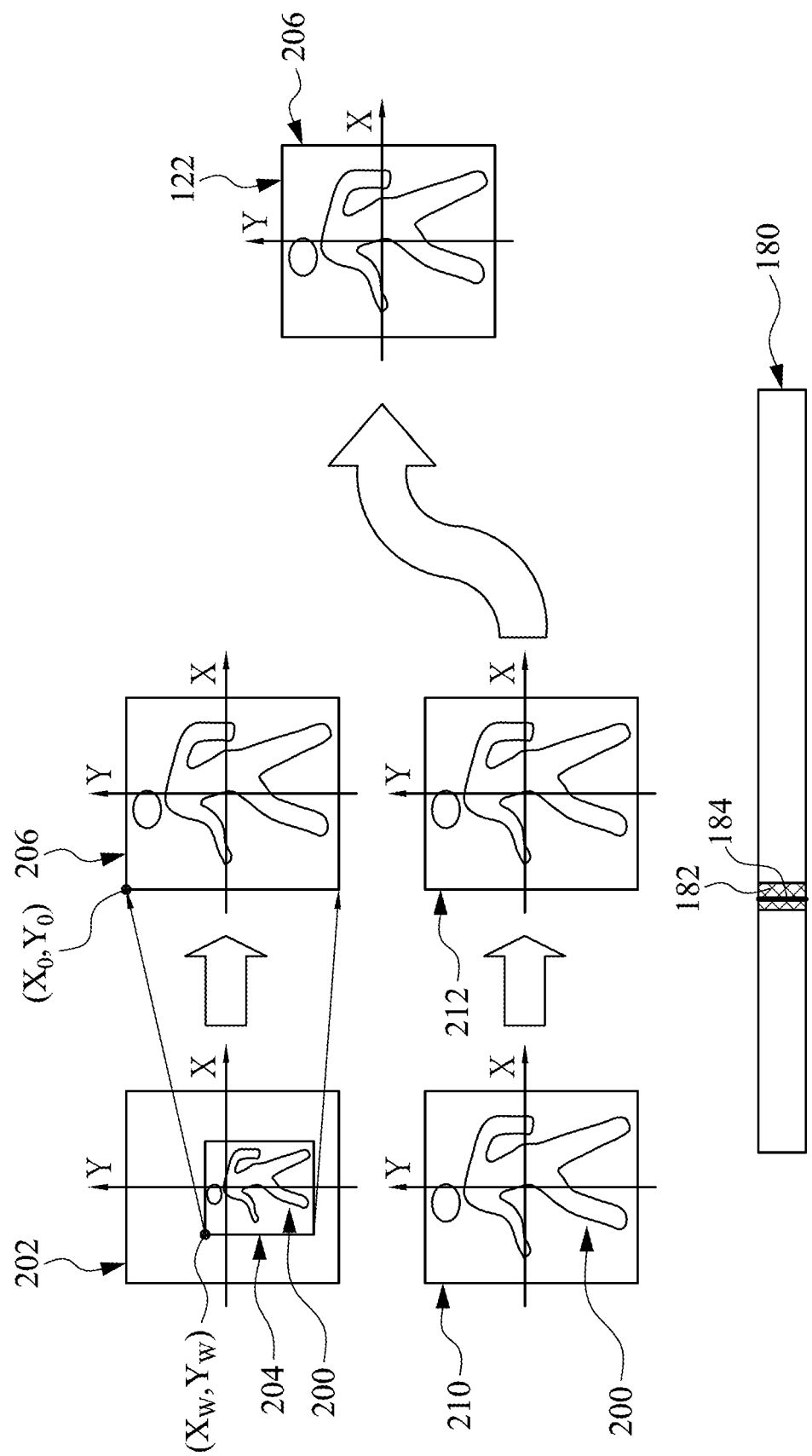
Figure 7:
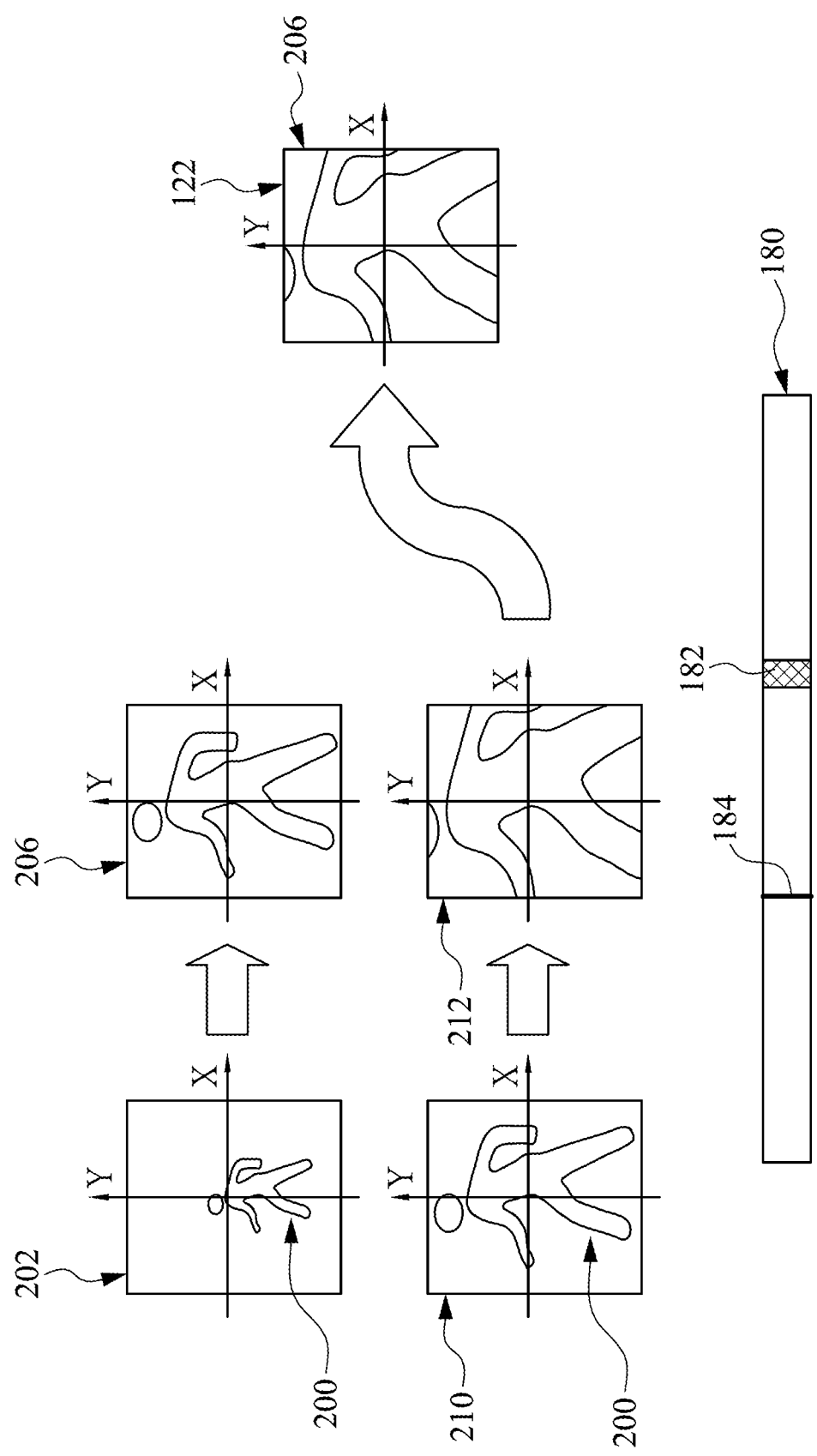
Figure 8:
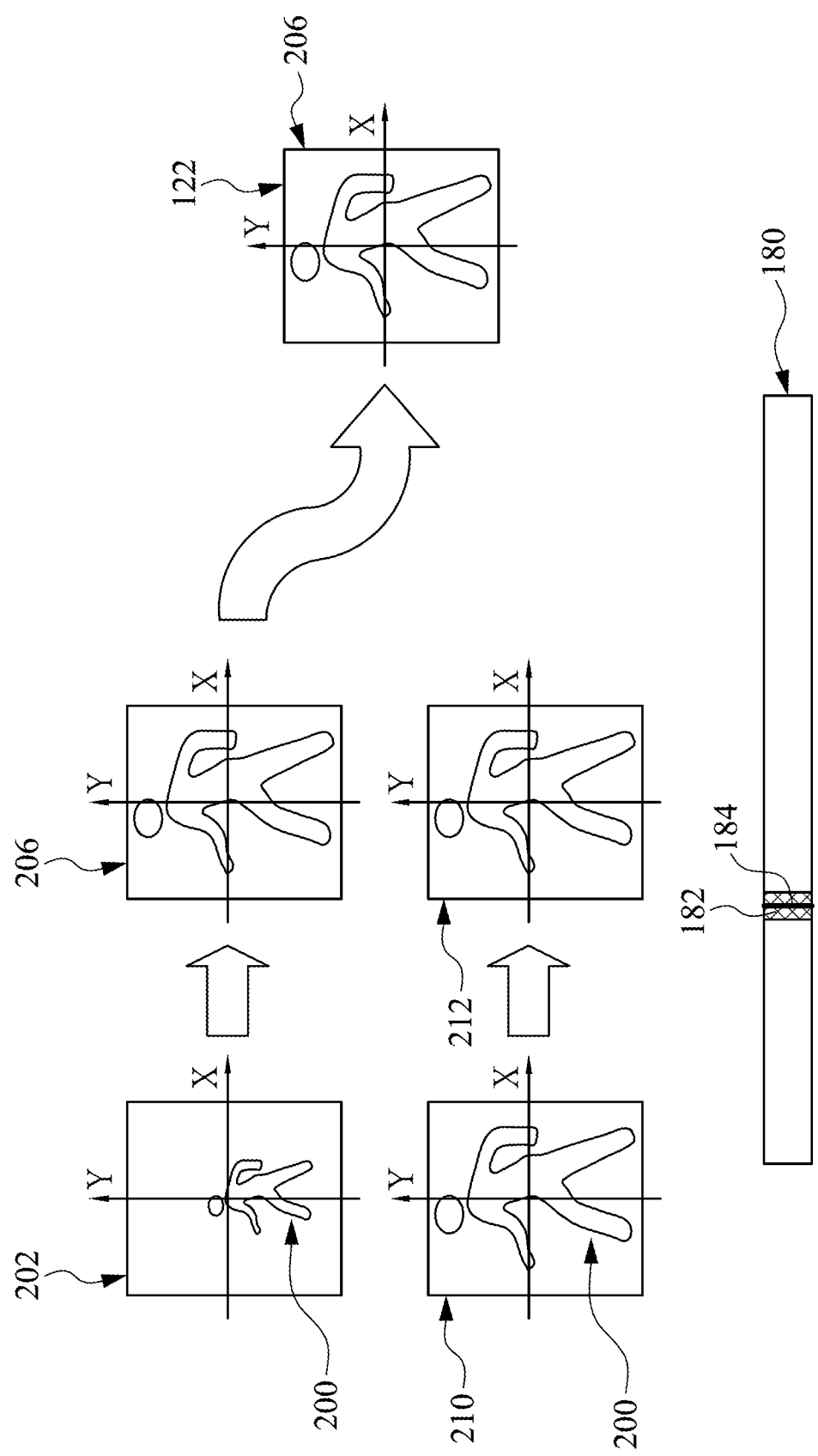
FIG. 8 is a schematic diagram showing a zoom-out action is performed whit a display screen of the image-capturing device.

An exemplary process for outputting an image is shown in FIGS. 5 to 8. FIGS. 5, 6, and 7 are schematic diagrams showing a zoom-in action is performed with a display screen of the image-capturing device. FIG. 8 is a schematic diagram showing a zoom-out action is performed with a display screen of the image-capturing device. In order to describe conveniently, a zoom ratio bar 180, a zoom ratio button 182, and a switch display ratio mark 184 are illustrated in each of FIGS. 5-8. The left-most end of the zoom ratio bar 180 is defined as a minimum zoom ratio of the image-capturing device, and the right-most end of the zoom ratio bar 180 is defined as a maximum zoom ratio of the image-capturing device. The zoom ratio button 182 can represent the current zoom ratio of the image-capturing device. When the location of the zoom ratio button 182 in the zoom ratio bar 180 is adjusted, the zoom ratio with respect to the image can be adjusted. For example, when the location of the zoom ratio button 182 is moved from left to right, the zoom ratio with respect to the image can increase. Furthermore, when the zoom ratio is not beyond the switch display ratio, the zoom ratio button 182 is located at the left side of the switch display ratio mark 184. When the zoom ratio is equal to the switch display ratio, the zoom ratio button 182 overlaps with the switch display ratio mark 184. When the zoom ratio is beyond the switch display ratio, the zoom ratio button 182 is located at the right side of the switch display ratio mark 184.

As shown in FIG. 5, the first camera can capture an image of the object in the first FOV, so as to produce a first image 202, and the second camera can capture an image of the object 200 in the second FOV, so as to produce a second image 210. As the zoom ratio increases and is not beyond the switch display ratio, the controller can select a display region 204 in the first image 202 according to the object distance of the object 200, and the display region 204 can be enlarged to become a first image 206. Selecting the display region 204 in the first image 202 by the controller can be implemented through coordinate transformation. For example, such selection can be implemented by the following equations (I) and (II):

$$Xw = \left(\frac{fw}{ft}\right) * Xo * \left(\frac{ZoomSW}{ZoomCRNT}\right) \qquad \text{equation (I)}$$

$$Yw = \left(\frac{fw}{ft}\right) * Yo * \left(\frac{ZoomSW}{ZoomCRNT}\right) - fw * \left(\frac{d}{Z}\right) * \left(\frac{ZoomCRNT\ 1}{ZoomSW-1}\right) \qquad \text{equation (II)}$$

In the equations (I) and (II), (Xw, Yw) is a coordinate representing the point at the top-left corner of the display region 204; fw is the first focal length of the first camera; ft is the second focal length of the second camera; z is the object distance of the object 200; d is the gap between the first camera and the second camera; ZoomSW is a setting value for the switch display ratio; ZoomCRNT is the current zoom ratio; and (Xo, Yo) is a coordinate representing the point at the top-left corner of the enlarged display region 204. At the time when the capturing (shooting) is performed, since the parameters fw, ft, z, d, ZoomSW, ZoomCRNT and the coordinate (Xo, Yo) are constants, the coordinate (Xw, Yw) can be calculated.

In the other hand, since the zoom ratio is not beyond the switch display ratio, no zoom-in/out action is performed with the second image 210. Accordingly, as shown by a second image 212, the appearance of the second image 210 is what the second camera captures at the minimum zoom ratio. Then, after the enlargement of the display region 204, the image output module can select an output image according to the current zoom ratio. As illustrated in FIG. 5, since the zoom ratio is not beyond the switch display ratio, the display screen 122 of the displayer can display the first image 206.

As shown in FIG. 6, if the zoom ratio increases to the switch display ratio, the controller could select the display region 204 in the first image 202 according to the object distance of the object 200 and enlarge the display region 204 to become the first image 206. How the controller selects the display region 204 in the first image 202 is the same as the coordinate transformation above, and thus it is not repeated herein.

In the other hand, since the zoom ratio is not beyond the switch display ratio, no zoom-in/out action is performed with the second image 210. Accordingly, as shown by the second image 212, the appearance of the second image 210 is what the second camera captures the image at the minimum zoom ratio. As illustrate in FIG. 6, since the zoom ratio is equal to the switch display ratio, the image output module can switch the output image from the first image 206 to the second image 212, such that the display screen 122 of the displayer can display the second image 212. Since the appearance of the first image 206 and the appearance of the second image 212 are approximately the same, the display screen 122 of the displayer can provide approximately the same appearance, thereby preventing the screen pulsation from occurring (or easing the scree pulsation off). Furthermore, although the second image 212 illustrated in FIG. 6 shows what the second camera captures the image at the minimum zoom ratio, such illustration is exemplary. That is, it can be understood that even if the zoom ratio is not beyond the switch display ratio, the appearance of the second image 212 may show what the second camera captures the image beyond the minimum zoom ratio thereof.

Reference is made to FIG. 7. As illustrated in FIG. 7, the zoom ratio is beyond the switch display ratio. At this time, since the zoom ratio is beyond the switch display ratio, no zoom-in/out action is performed with the first image 206 and therefore the appearance of the first image 206 shows what the first camera captures the image at the maximum zoom ratio thereof. When the zoom ratio increases, the second image can be correspondingly enlarged, as shown by the second image 212. Then, after second image 210 is enlarged to become the second image 212, the image output module can select an output image according to the current zoom ratio. Accordingly, the second image 212 is displayed on the display screen 122 of the displayer.

Reference is made to FIG. 8. When the zoom ratio decreases to be close the switch display ratio, the second image 210 can be resized to become the second image 212, in which the second image 212 illustrated in FIG. 8 is shrunk relative to the second image 212 illustrated in FIG. 7. On the other hand, no zoom-in/out action is performed with the first image 206. When the zoom ratio decreases to be equal to the switch display ratio, the appearance of the second image 212 and the appearance of the first image 206 are approximately the same. At this time, since the zoom ratio decreases to be equal to the switch display ratio, the image output module can switch the output image from the second image 212 to the first image 206, such that the first image 206 can be displayed on the display screen 122 of the displayer. Since the display screen 122 of the displayer can provide approximately the same appearance, the screen pulsation can be prevented (or be eased off).

Reference is made to FIG. 9, which is a schematic three-dimensional view of an image-capturing device 300 according to a second embodiment of the present disclosure. The present embodiment between the first embodiments is that the image-capturing device 300 of the present embodiment further includes a sensor 302. The sensor 302 can be disposed on the camera module 310 and located between the first camera 312 and the second camera 314. The sensor 302 can be configured to detect an object distance (e.g., the object distance DO illustrated in FIG. 1) from the object (e.g., the object 200 illustrated in FIG. 1) to the camera module 310. For example, the sensor can obtain the object distance through detecting time-of-flight (TOF). That is, the sensor 302 can emit a near infrared light beam to the object and receive the near infrared light beam reflected from the object, and then the object distance is obtained by a time difference or phase difference between the emitting and the receiving. In other words, in the present disclosure, in addition to calculating the object distance by the auto focusing program, the object distance can be obtained by extra using the sensor 302.

Further, in the present disclosure, in addition to the above ways to obtain the object distance, image-capturing device 300 can provides a user with an input interface to input the object distance. For example, the user can input the object distance information into the object distance unit 148 of FIG. 4, and then the object unit can be configured to transmit the object distance information to the controller by a form of digital signals, so as to make the controller record the object distance of the object.

Reference is made to FIG. 10, which is a schematic three-dimensional view of an image-capturing device 400 according to a third embodiment of the present disclosure. The image-capturing device 400 of the present embodiment can be applied to a security camera. The image-capturing device 400 includes a housing 402, a bottom base 404, a top base 406, and a camera module 410. The bottom base 404 and the top base 406 are partially covered by the housing 402, and the top base 406 is disposed on the bottom base 404. The top base 406 can perform relative motion with respect to the bottom base 404. For example, the top base 406 can rotate relative to the bottom base 404. The camera module 410 can be disposed on the top base 406 and include a first camera 412 and the second camera 414. When the top base 406 rotates relative to the bottom base 404, FOV of the first camera 412 and the second camera 414 of the camera module 410 are correspondingly varied. The image-capturing device 400 may further include a controller (not illustrated). As previously described, the controller can select the display region according to the object distance, thereby preventing the screen pulsation from occurring (or easing the scree pulsation off), and it is not repeated herein.

Furthermore, in the situation involving the image-capturing device is applied to the security camera, the displayer as described previously cam be omitted. For example, the image captured by the camera module can be directly recorded as digital data and is not displayed simultaneously in real time. In other embodiments, in the situation involving the image-capturing device is applied to the security camera, the displayer may be disposed by an external connection, and thus the displayer can serve as an external device with respect to the image-capturing device, so as to form an image-capturing system.

As described above, the image-capturing device of the present disclosure includes the camera module, the displayer, and the controller. The camera module is configured to capture the image of the object and includes the first camera and the second camera. When the zoom ratio of the image displayed by the camera module gradually increases, what the display screen of the displayer displays can be switched from the first image captured by the first camera to the second image captured by the second camera. At the time when the zoom ratio of the first image increases, the can select the display region in the first image according to the object distance, such that the display region can be enlarged and displayed on the displayer. By such configuration, at the time when the zoom ratio of the image of the image-capturing device is close to the switch display ratio, the appearance of the second image and the appearance of the first image are approximately the same such that the first image can be smoothly switched to the second image. Therefore, the appearance of the first image and the appearance of the second image can match each other, thereby preventing the screen pulsation from occurring (or easing the screen pulsation off).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of the present disclosure provided they fall within the scope of the following claims.

What is claimed is:

1. An image-capturing device comprising:
a camera module configured to capture an image of an object, wherein the image is displayed by a displayer, and the camera module comprises:
a first camera having a first focal length and a first field of view (FOV) and configured to capture an image in the first FOV, so as to produce a first image; and
a second camera spaced apart from the first camera by a gap, and the second camera having a second focal length and a second FOV, wherein the first FOV is wider than the second FOV, the second camera is configured to capture an image in the second FOV, so as to produce a second image, wherein the displayer displays one of the first and second images; and
a controller configured to select a display region in the first image according to an object distance from the object to the camera module when a zoom ratio of the first image is increased to a switch display ratio, such that the display region is enlarged to form an enlarged display region and then the enlarged display region is displayed on the displayer before the displayer displays the second image, wherein the enlarged display region is matched with the second image in appearance, a coordinate of the enlarged display region is determined by the controller according to a ratio of the gap and the object distance, a coordinate of the display region and an offset value between the first image and the second image which are at the same zoom ratio, the controller comprises a calculation unit configured to calculate the offset value according to the object distance, the first focal length, and the second focal length.

2. The image-capturing device of claim 1, wherein the first focal length is less than the second focal length.

3. The image-capturing device of claim 1, wherein the camera module further comprise:
an auto focus module configured to make the first camera focus on the object, wherein the first camera has a first focal length, and the controller is further configured to calculate the object distance according to the first focal length and a focus position of the first camera which is focused on the object.

4. The image-capturing device of claim 1, wherein a point at a top-left corner of the coordinate of the enlarged display region is corresponding to a point at a top-left corner of the coordinate of the display region, so that the display region of the first image is corresponding to the second image matched with the enlarged display region in appearance.

5. An image-capturing device comprising:
a camera module configured to capture an image of an object, wherein the image is displayed by a displayer, and the camera module comprises:
a first camera having a first focal length and a first field of view (FOV) and configured to capture an image in the first FOV, so as to produce a first image; and
a second camera spaced apart from the first camera by a gap, and the second camera having a second focal length and a second FOV, wherein the first FOV is wider than the second FOV, the second camera is configured to capture an image in the second FOV, so as to produce a second image, wherein the displayer displays one of the first and second images, and the first camera and the second camera are spaced apart from each other by a gap;
a sensor configured to detect an object distance from the object to the camera module; and a controller configured to select a display region in the first image according to the object distance when a zoom ratio of the first image is increased to a switch ratio, such that the display region is enlarged to form an enlarged display region and then the enlarged display region is displayed on the displayer before the displayer displays the second image, wherein the enlarged display region is match with the second image in appearance, a coordinate of the enlarged display region is determined by the controller according to a ratio of the gap and the object distance, a coordinate of the display region and an offset value between the first image and the second image which are at the same zoom ratio, the controller comprises a calculation unit configured to calculate the offset value according to the object distance, the first focal length, and the second focal length.

6. The image-capturing device of claim 5, wherein a point at a top-left corner of the coordinate of the enlarged display region is corresponding to a point at a top-left corner of the coordinate of the display region, so that the display region of the first image is corresponding to the second image matched with the enlarged display region in appearance.

7. A method for operating an image-capturing system comprising:

producing a first image through capturing an object within a field of view (FOV) by a first camera having a first focal length and producing a second image through capturing the object by a second camera having a second focal length, wherein the first camera and the second camera are spaced apart from each other by a gap;

displaying the first image by a displayer, wherein a display region in the first image is selected according to an object distance of the object when a zoom ratio of the first image is increased to a switch display ratio such that the display region is enlarged to form an enlarged display region and then the enlarged display region is displayed on the displayer, wherein the enlarged display region is matched with the second image in appearance, a coordinate of the enlarged display region is determined by a controller according to a ratio of the gap and the object distance, a coordinate of the display region and an offset value between the first image and the second image which are at the same zoom ratio, the controller comprises a calculation unit configured to calculate the offset value according to the object distance, the first focal length, and the second focal length; and switching to display the second image.

8. The method for operating the image-capturing system of claim 7, further comprising:

detecting a distance from the object to a camera module comprising the first camera and the second camera by a sensor, so as to obtain the object distance.

9. The method for operating the image-capturing system of claim 7, further comprising:

focusing the first camera on the object; and calculating the object distance according to the first focal length of the first camera and a focus position of the first camera which is focused on the object.

10. The method for operating the image-capturing system of claim 7, wherein a point at a top-left corner of the coordinate of the enlarged display region is corresponding to a point at a top-left corner of the coordinated of the display region, so that the display region of the first image is corresponding to the second image matched with the enlarged display region in appearance.

\* \* \* \* \*